Patented May 13, 1930

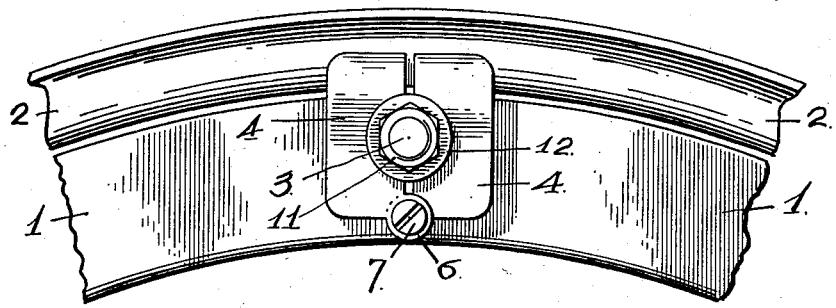
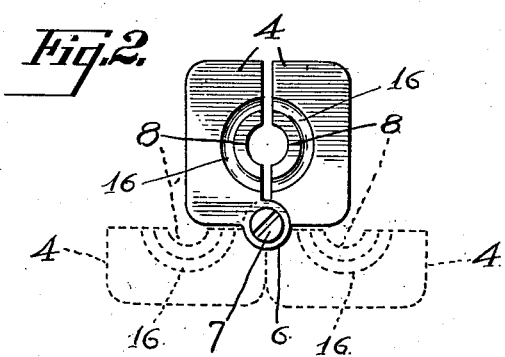
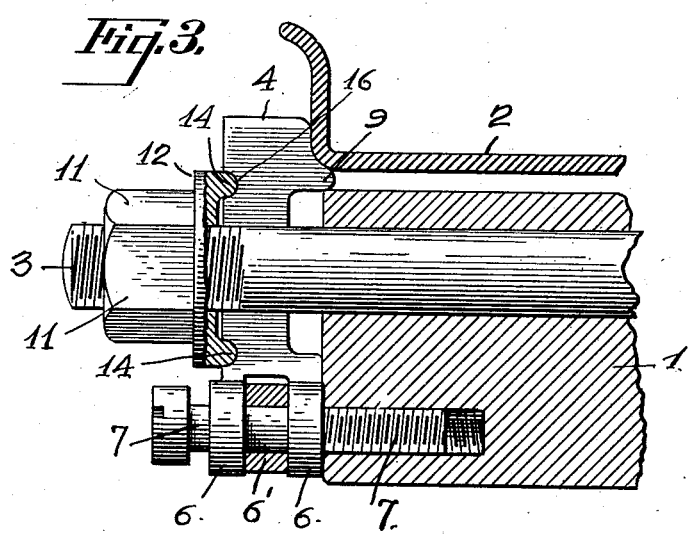

1,758,310

UNITED STATES PATENT OFFICE

ARCHIBALD C. BREYER, OF BURLINGAME, CALIFORNIA

AUTOMOBILE TIRE-RIM LUG

Application filed September 11, 1929. Serial No. 391,826.

My invention relates to improvements in rim lugs for detachably securing demountable tire rims upon the wheels of automobiles and the like wherein a pair of matching lug members are pivotally mounted adjacent each lug bolt of a wheel, said lug members being locked against pivotal movement when a retaining nut is tightened and being releasable for pivotal movement out of engagement with the tire rim when the retaining nut is slightly loosened.

The primary object of my invention is to provide an improved retaining lug for automobile tire rims and the like.

Another object is to provide an improved rim lug which will facilitate the removal and replacing of tire rims.

A further object is to provide an improved device of the character described wherein matching lug members are pivotally mounted upon the wheel and are arranged to be moved to disengage a tire rim when a retaining nut is but slightly loosened and without removing the lug members from the wheel.

Another object is to provide an improved device wherein pivoted lug members are normally locked against pivotal movement to releasing positions.

A still further object is to provide a rim lug of simple and improved construction which is efficient in operation and which can be readily applied in connection with the ordinary wheels and lug bolts now in service.

I accomplish these and other objects by means of the improved device disclosed in the drawings forming a part of the present application wherein like characters of reference are used to designate similar parts throughout the specification and drawings and in which—

Fig. 1 is a side elevation of a portion of a wheel and tire rim with my improved rim lug in operative position;

Fig. 2 is a view of the rim lug disclosing the relation of the pivoted lug members; and Fig. 3 is an enlarged vertical sectional detail disclosing the structure and relation of the lug parts.

Referring to the drawings, the numeral 1 is used to designate in general a wheel felloe such as commonly used in the construction of automobile wheels and the like, and around which is mounted the usual demountable tire rim 2. A suitable number of lug bolts 3 are secured upon the felloe 1 to provide an outwardly extending threaded end in the ordinary manner.

My improved lug comprises a pair of matching lug members 4 provided with bearing portions 6 and 6' arranged to engage a common pivot pin 7 threaded or otherwise secured upon the felloe 1 adjacent each lug bolt 3. The lug members 4 are provided with matching recesses 8 formed in adjacent edges thereof to embrace the adjacent bolt 3, said members being arranged to be turned upon their common pivot pin to engage opposite sides of the bolt 3. The free ends of the members 4 are movable into engagement with the adjacent edge of the rim 2 and are preferably provided with ribs 9 adapted to be wedged between the edge of the rim and the adjacent edge of the felloe 1 to rigidly secure the rim upon the wheel.

A nut 11 is threaded onto the outer threaded end of each bolt 3 and arranged to be moved along said bolt to engage and disengage the lug members 4 as desired. The outer end of the nut is shaped to receive a wrench in the ordinary manner. The inner end of the nut 11 is provided with an annular flange 12 having an annular bead or rib 14 formed upon the inner surface thereof. Arcuate grooves 16 are formed upon the outer faces of the lug members 4, said grooves being arranged in matching relation concentric with the recesses 8 to form an annular channel in the faces of said lug members when moved into operative engagement with the bolt 3 and rim 2 as best shown in full lines in Fig. 2 of the drawings. The rib 14 is arranged to match with the channel formed by the grooves 16 and to be received by said channel to lock the lug members 4 against pivotal movement when the nut is advanced along the bolt to engage said lug members.

In operation, the lug members 4 are secured upon the felloe 1 by the pivot pin 7, said pin 7 being arranged to permanently retain the lug members upon the felloe and to permit a free pivotal movement and a limited sliding movement of the lug members relative to the pivot. In securing a rim 2 upon the wheel, the rim is placed around the felloe 1 in the ordinary manner while the lug members are swung to an inoperative position such as indicated in dotted lines in Fig. 2 of the drawings. When the rim is in position, the lug members 4 of each pair are turned upon their pivot pins 7 to engage the adjacent bolts 3, thereby causing the free ends of the lug members to engage the rim 2 as shown in Figs. 1 and 3. The nut 11 is then tightened against the matching lug members 4, to press the lug members against the side of the rim and thereby seat and clamp the rim upon the wheel. As the nut 11 is tightened, the rib 14 enters the annular channel formed by the grooves 16, said rib and channel being concentric with the axis of the bolt 3 whereby the rib may move through the groove as the nut is tightened. When the nut has been fully tightened, the rib 14 is firmly seated within the grooves 16, thereby locking said members against pivotal movement.

To remove the rim, a slight loosening of the nuts 11 will cause their respective ribs 14 to disengage the grooves 16, thereby permitting the lug members 4 to be swung out of operative position as shown in full lines in the drawings, to an inoperative position as indicated in dotted lines in Fig. 2. The rim 2 is thus freed and may be removed from the wheel past the lug members 4 without removing said lug members from the wheel, and without further loosening of the nuts 11.

Thus a slight turning of the nuts 11 will operate to release the lugs and permit pivotal movement of the same to operative or inoperative position as desired, and a corresponding tightening of the nut against the lug members 4 when in operative position will serve to lock the same. In this manner a great saving of time and effort is effected in removing and replacing a rim, and danger of losing the lugs or nuts during such operations is effectually avoided.

The specific details of construction of my improved rim lug can be modified in a number of ways without departing from the spirit of my invention. I therefore desire to avail myself of all modifications which may fall within the scope of the appended claims.

Having thus described my invention, what I claim as new and desire to secure by Letters Patent is:

1. An automobile tire rim lug comprising a lug member pivotally mounted upon the felloe of a wheel adjacent a lug bolt thereof and pivotally movable in a plane parallel to the plane of the wheel into engagement with the bolt and a rim mounted upon the wheel; a nut mounted upon the outer end of the bolt; and a rib engaging a matching groove, said rib and groove being formed in concentric relation upon adjacent faces of the nut and lug member to hold the member against pivotal movement when the nut is tightened thereagainst.

2. An automobile tire rim lug comprising a pair of lug members pivotally mounted upon the felloe of a wheel adjacent a lug bolt thereof, said members being movable into engagement with opposite sides of the bolt and into retaining engagement with a rim mounted upon the wheel; a nut mounted upon the outer end of the bolt; and a matching rib and groove formed upon adjacent surfaces of the nut and the lug members and movable into engaging relation to prevent pivotal movement of the lug members when the nut is tightened thereagainst.

3. An automobile tire rim lug comprising a pair of lug members pivotally mounted upon a felloe of a wheel adjacent a lug bolt thereof, said members having recesses formed in the adjacent edges thereof to engage the bolt and having arcuate grooves formed concentrically with the recesses and adapted to form an annular channel around the bolt when the members are moved into engaging relation with the bolt; a nut mounted upon the outer end of the bolt; and an annular rib formed upon the inner end of the nut to seat within the channel formed by the arcuate grooves to prevent pivotal movement of the lug members when the nut is tightened against said members to press the same into retaining engagement with a rim mounted upon the wheel.

4. An automobile tire rim lug comprising a pair of lug members provided with matching pivot bearing portions and having recessed faces; a pivot pin extending through the matching bearing portions and secured to a wheel felloe adjacent a lug bolt thereof; the lug members being pivotally movable upon the pivot pin to engage the lug bolt between the matching recesses of said lug members; a nut mounted upon the outer end of the bolt; and an annular rib formed upon the inner end of the nut to engage an annular channel formed by arcuate grooves formed in the outer faces of the lug members to prevent pivotal movement of said members when the nut is tightened against said members to press the same into retaining engagement with a rim mounted upon the wheel.

In witness whereof, I hereunto set my signature.

ARCHIBALD C. BREYER.